United States Patent [19]

Stong

[11] Patent Number: 5,117,366
[45] Date of Patent: May 26, 1992

[54] AUTOMATED CARVING SYSTEM

[76] Inventor: Jerald W. Stong, 3158 Fowler St., Santa Clara, Calif. 95051

[21] Appl. No.: 372,730

[22] Filed: Jun. 28, 1989

[51] Int. Cl.$^5$ .......................... G06F 15/46; B24B 1/00
[52] U.S. Cl. ....................... 364/474.02; 51/311; 51/415; 364/474.06; 364/474.24
[58] Field of Search ............. 364/474.02, 474.24, 364/474.06, 468, 191–193; 51/410, 415, 416, 310–312, 317–321, 283 R; 156/154, 240, 645, 659.1; 430/256, 258

[56]  References Cited

U.S. PATENT DOCUMENTS

| | | | |
|---|---|---|---|
| 3,843,875 | 10/1974 | Goodstal et al. | 364/474.02 |
| 3,857,025 | 12/1974 | English et al. | 364/474.02 |
| 4,430,416 | 2/1984 | Goto et al. | 51/310 X |
| 4,437,150 | 3/1984 | Dahlgren, Jr. et al. | 364/474.02 X |
| 4,702,786 | 10/1987 | Tallman | 156/154 |
| 4,801,490 | 1/1989 | Schuette | 51/310 X |
| 4,834,595 | 5/1989 | Cacciotti | 364/474.02 X |
| 4,834,833 | 5/1989 | Palmer | 51/310 X |
| 4,928,221 | 5/1990 | Belkhiter | 364/474.24 X |
| 4,972,323 | 11/1990 | Cauwet | 364/474.02 X |

*Primary Examiner*—Joseph Ruggiero
*Attorney, Agent, or Firm*—Skjerven, Morrill, MacPherson, Franklin & Friel

[57]  ABSTRACT

A system is provided for a process of carving images into the surface of a glass panel. The process is also applicable to other materials such as stone, plastic, and metal. The system includes a computer aided design and manufacturing system to control the carving process. The system is automated and includes a sand blast head which recycles the blast medium and specialized computer software for control of the process.

19 Claims, 8 Drawing Sheets

AUTOMATED CARVING SYSTEM

BACKGROUND OF THE INVENTION

1. Field of the Invention

This invention relates to a method and device for forming images in a surface of a material. More specifically, the invention relates to an automated process for carving images in glass panels or similar materials.

2. Description of the Prior Art

There are at least three conventional methods of forming images on glass or similar materials. These methods include etching, carving, and grinding. Etching is a chemical process in which only the surface of the glass is etched away. Patterns are created by allowing the etching solution to touch only the areas to be etched. A similar surface effect is created by using a protector and lightly sand blasting the exposed areas. Carving by means of sand blasting is similar to the above mentioned variation of etching, except that the sand blasting process typically cuts deeply into the surface. Carving can include surface effects, but is characterized typically by deep cuts into the surface of the panel. Grinding is the process in which a grinding wheel grinds grooves into the surface. The cuts are deep, but tend to be straight line or circular in nature due to the limitations of the grinding wheel.

The process of carving flat panels of glass or similar material such as stone, concrete, etc. is well known. Typically, in the prior art the first step is to apply a resist material to the surface of the panel. It is conventional to use a commercially available heavy contact paper or plastic for this purpose. Next, a design is drawn on the contact paper or plastic. The design is the image which is desired to be formed on the panel. Then the portions of the resist material where the carving is to take place are removed. The next step is to sand blast the surface of the panel. The areas which are protected by the remaining resist material are unaffected, but in the exposed areas the panel is carved away by the sand blasting and a frosted finish is left which is the desired image. The above steps may be repeated several times to create the desired effects in the panel, i.e., carving of various depths.

The typical application of carving is forming decorative designs on glass panels such as are used in buildings.

The above-described methods of forming images are typically limited by the fact that they are completely manual processes, and thus labor intensive and tend to be slow and expensive. They also require a significant level of skill by the operator to achieve the precisely desired effects. The above-described methods also have the short coming that the artist who makes the design is typically not the same person as the operator who actually implements the design. Thus it is possible for artistic effects to be lost in the translation between the designer's concept and the implementation by the operator of the equipment.

SUMMARY OF THE INVENTION

In accordance with the invention a method and device are provided which automate the steps involved in carving glass or other surfaces. A layer of resist is conventionally formed on the surface (such as a glass panel) to be carved. A pattern is automatically drawn and the resist is automatically cut on the pattern by computer aided equipment. The resist then may be peeled or cleared away by the same computer aided equipment. Automated equipment also controls the actual carving process. Also in accordance with the invention an apparatus is provided to carry out the above steps. In various embodiments of the invention only some of the above steps may be automated, and others may still be performed manually.

The invention provides the advantage over the prior art of automating what was heretofore a manual process. The invention thus has the advantage of being less expensive than the prior art methods. In addition, the present invention allows the designer of the pattern to implement exactly his desired design by the use of computer aided design and manufacturing equipment. Thus the final design formed in the material is exactly that which is desired by the designer. The invention also allows cost savings by permitting the use of unskilled operators of the equipment. In some embodiments of the invention, the process is completely automated and no operator at all may be needed. Thus substantial cost savings are provided over the prior art system.

In accordance with the invention, a method is provided to form images in a surface of glass or similar material such as stone, plastic, imitation stone or concrete by using an automated design and manufacturing system preferably under computer control. In accordance with the invention the pattern making and carving of the surface are under computer control. Also, in accordance with the invention the computer software which is used to control the automated system is optimized to provide an efficient numerically controlled method of computer aided manufacturing for forming images in the surface by dividing a master drawing into subdrawings and then translating each subdrawing into a set of numerical control instructions.

BRIEF DESCRIPTION OF THE DRAWINGS

Similar reference numbers in various figures denote similar or identical structures.

Appendix A shows a computer program in accordance with the invention.

DETAILED DESCRIPTION OF THE INVENTION

Computer aided design and manufacturing systems are well-known in the art. In accordance with the present invention a conventional computer aided design and computer aided manufacturing system (CAD/CAM) in conjunction with a specially provided apparatus and software accomplishes the carving process. A CAD/-

Figure 1:
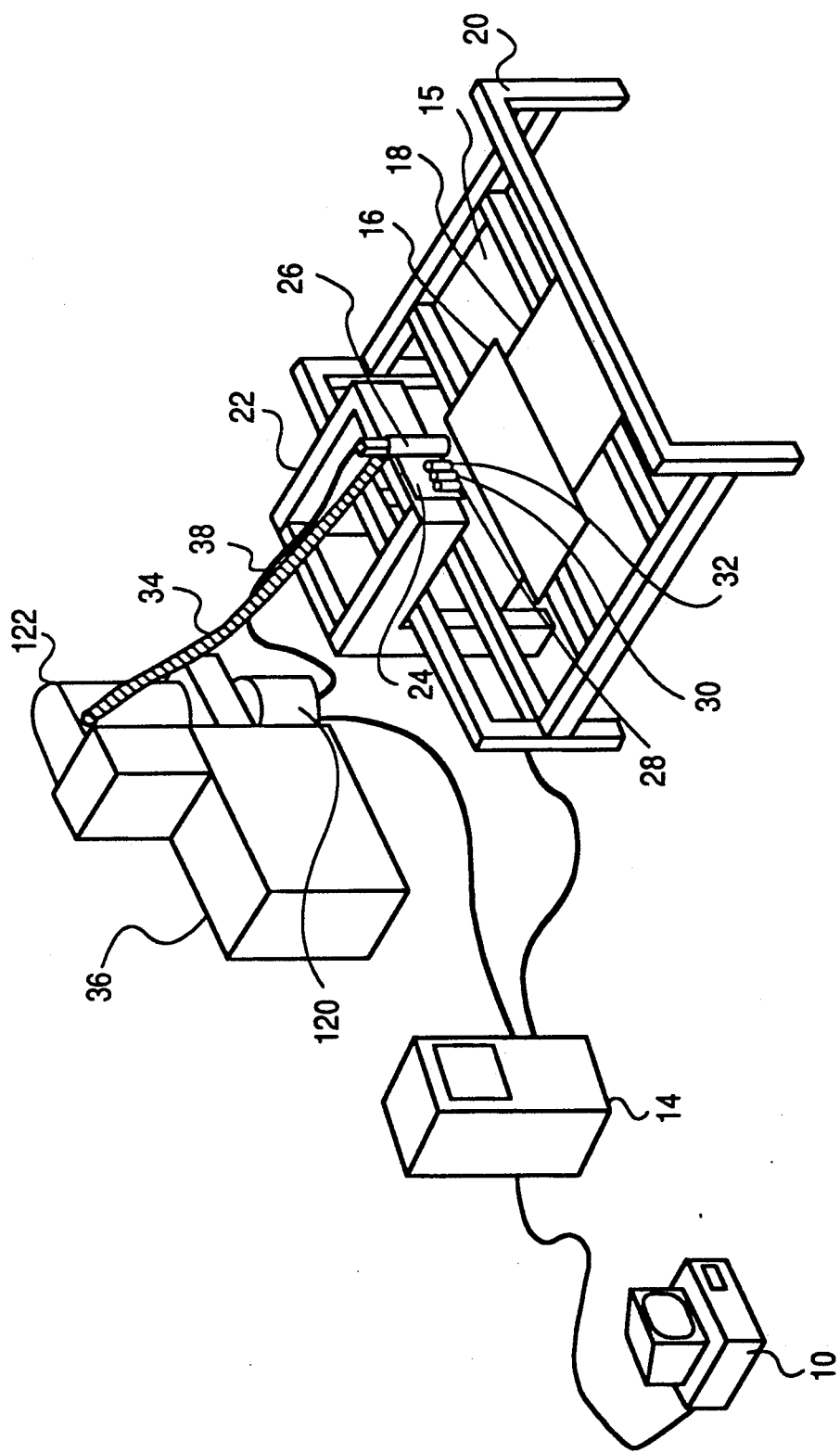
FIG. 1 shows an overall view of an apparatus in accordance with the invention.

CAM numerically controlled manufacturing system in accordance with the invention includes the elements shown in FIG. 1.

An IBM PC-compatible (or other) computer 10 has running on it computer aided design (CAD) software (not shown). The computer aided design software interfaces to computer aided manufacturing (CAM) software (not shown) on computer 10. The design data developed by the designer with the use of the computer aided design software thus serves as an input to the computer aided manufacturing software. The computer aided manufacturing software then provides data to machine tool post processor software also in computer 10. This post processor software generates machine instructions. These machine instructions are then provided to numerical control NC controller 14 which controls the actual manufacturing process.

Numerical control (NC) controller 14 is connected electrically to control an XY table 15 which includes working surface 16 mounted on subplate 18. The panel to be carved (not shown) rests on working surface 16. Subplate 18 is mounted conventionally on frame 20. Also mounted on frame 20 is support 22 on which is mounted a head plate 24. Blast head 26 and spindles 28, 30, 32 are mounted on headplate 24, and are electrically controlled also by NC controller 14. The blasting medium (e.g., sand) used by blast head 26 is recovered by hose 34, reclaimed in reclaiming apparatus 36, and returned to blast head 26 by hose 38.

The above automated system in accordance with the invention is applied to the carving process. The following steps in one embodiment of the invention are used to carry out the method of the invention.

First the designer makes an engineering drawing of the desired image using conventional computer aided design (i.e., interactive graphics) hardware and software embodied in computer 10.

Next, this engineering drawing of the design is interpreted in computer 10 in terms of the manufacturing processes to be used. This process planning step is needed for preparation of the numerical control instructions. The numerical controlled instructions are a listing of the sequence of operations which must be performed to create the desired image on the surface.

A conventional part programmer program on computer 10 plans the portions of the process to be accomplished by numerical control. Part programmers are software programs which have detailed knowledge about machine operations and the manufacturing process. They plan the sequence of machining steps to be performed by the numerical controller and document these steps in a particular format.

The computer 10 interprets the list of part program instructions, performs the necessary calculation to convert each instruction to a detailed set of machine tool motion commands, and then develops a computer file containing the numerical control data for the specific NC controller 14 involved in the manufacturing process to be performed. The computer file can be transferred from computer 10 to the NC controller 14 by several conventional methods including paper tape, floppy disks, hard wire connections (as shown), or modems.

The last step in the computer aided manufacturing process is the use of the numerical controlled program in production. This step includes initializing the NC controller 14, and loading the resist coated panel onto XY table 16. The numerical controlled system then processes the panel according to the instructions in the numerical controlled program. When the program is completed the carved panel is removed from working surface 16 and the process is started again from the beginning on a fresh panel.

In accordance with the invention, the numerical control carving apparatus includes three chief components: an NC controller 14; numerical controlled positioning equipment as described below; and numerical controlled processing equipment as described below. These three elements operate together to execute the design patterns created by the CAD system.

The NC controller 14 includes a central processing unit (i.e., a computer) and conventional support systems to interface with the manufacturing equipment. In accordance with the invention, preferably a commercially available Allen Bradley Series B 8400 MP control system is used for NC controller 14, but any of the well-known commercially available units may be substituted. The central processing unit in conjunction with its support systems is capable of interpreting the instructions provided by the NC post processor program, and controlling the various aspects of the manufacturing system. These aspects include controlling positioning on one or more axis, monitoring the status of various indicators, and turning the equipment on and off.

The carving process in accordance with the invention requires accurate positioning control during the cutting of the resist and during the sand blasting process. These steps require precise control of the position of cutting spindles 28, 30, 32 and blast head 26 with reference to the panel being processed. The NC controller 14 thus also controls the motion of the resist cutting spindles 28, 30, 32 and the position of the nozzle within the blast head 26.

In accordance with the invention, the carving apparatus includes a closed chamber sand blast and blast media reclaiming head 26. This feature provides the advantage of making it possible to perform the carving in an open room. This is an advantage over the prior art in which frequently sand blasting takes place in an enclosed booth in order to prevent contamination of the environment by the medium (i.e., grit) used in the blasting and the debris which is removed by the sand blasting.

Therefore, in accordance with the invention, a blast nozzle (described below) used for sand blasting is enclosed in a blast head 26 which is connected to a conventional vacuum reclaiming system 36. The blasting medium, i.e. typically silicon carbide or other similar material, is shot at high speed under air pressure from the blast head 26 towards the panel surface. When the medium strikes the panel surface, each particle in the medium causes a small pit to form in the panel and the particle bounces off the panel. The bounced-off particle is sucked by the vacuum reclaiming system through hose 34 into a cyclone separator 36 along with the other such particles, where air currents and gravity are used conventionally to separate the heavy debris from the fine dust in the separator 36. The heavier portion of the material is recycled to be used again via hose 38, and the fine dust is filtered and discarded. The continuous pitting action caused by the sand blasting action on the panel surface erodes the panel away wherever the surface is not protected by the resist material. The sand blasting and reclaiming system 36 are controlled preferably by the NC controller 14.

In accordance with the invention, a commercially available CAD software program called Autocad available from Auto Desk Inc. is used to design the pattern. The CAD program runs preferably on computer 10. Autocad is used by the designer to create drawings which contain the specific information needed. Other commercially available or custom designed CAD programs may be used in other embodiments of the invention. Autocad generates ASCII text drawing interchange files called DXF files which contain all of the drawing information.

Also in accordance with the invention, a second commercially available software program called "The Complete Post Processor" commercially available from NC Micro Products Inc. runs on computer 10. This program converts the DXF output files from Autocad into the required NC machine code for use by the NC controller 14 in accordance with the invention. The output file generated by this program meets the interchangeable variable block data format for positioning, contouring, and contouring/positioning numerically controlled machines (RS-274/D) approved by the Electronic Industries Association.

As described above, preferably the NC controller 14 manufacturing equipment includes an Allen Bradley Series B 8400MP numerical controller 14. The output file from the post processor computer program is transferred to the NC controller 14 for use as a pattern program. The NC controller 14 sequentially reads each instruction code from the post processor program and takes the appropriate action as defined by the hardware controlled by the NC controller 14.

The NC controller 14 in accordance with the invention controls four axes of motion. These include the X, Y, Z, and W axis. The X and Y axis are used to position the work surface 16 with respect to a fixed work point. The Z axis is used to locate one of three cutting spindles 28, 30, 32 or the blast head 26 at the fixed work point, as described below. The W axis positions the blast nozzle in the blast head 26. In addition to controlling the positioning of the four axis, the NC controller 14 monitors inputs, operates relays as needed, and opens and shuts valves to control the movement of the blast media through hoses 34, 38 and separator 36.

Figure 2:
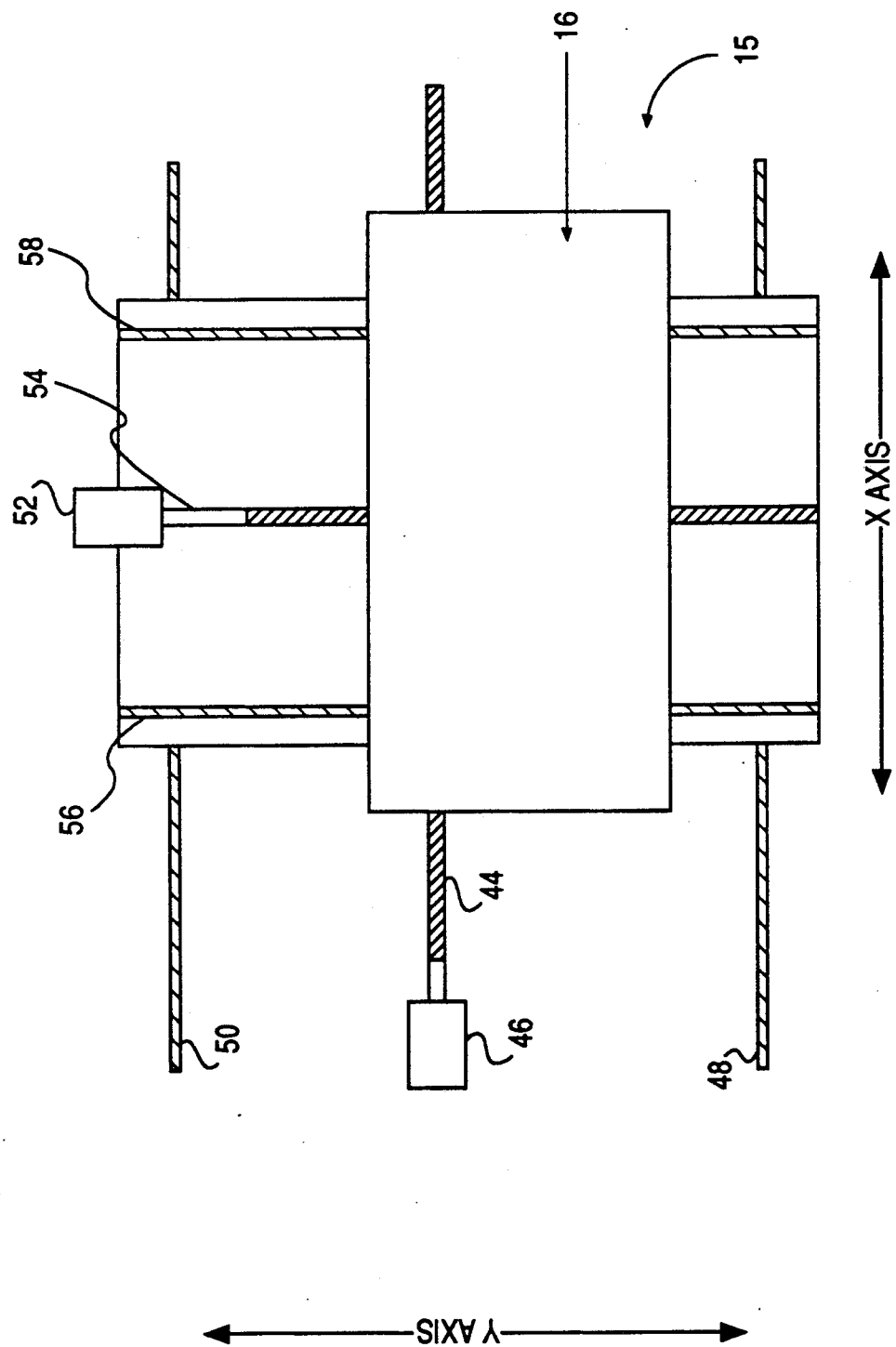
FIG. 2 shows an XY table in accordance with the invention.

Shown in FIG. 2 is a top view of the XY table 15 which provides motion in the X and Y axis. The working surface 16 is shown, as are the X axis and Y axis. The motion of the XY table 15 along the X axis and Y axis is controlled by the NC controller 14 (see FIG. 1).

Also shown in FIG. 2 are the X axis lead screw 44 driven by the X axis motor 46 and the X axis rails 48, 50 which guide the motion of the working surface 42. Similarly for the Y-axis motion, the Y-axis motor 52, lead screw 54, and rails 56, 58 are shown.

Figure 3:
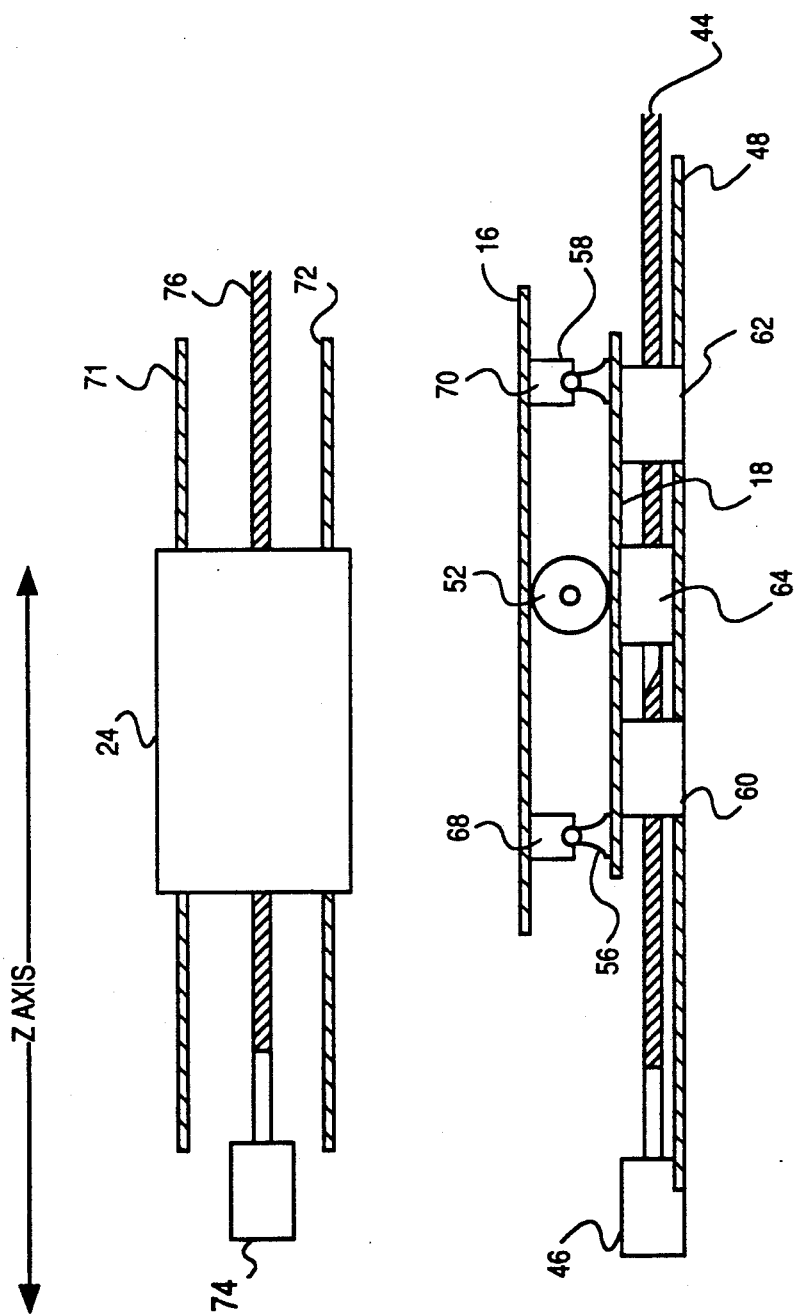
FIG. 3 shows a Z-axis positioner in accordance with the invention.

Shown in FIG. 3 is a side view of the XY table 15 as described above and the Z axis head plate 24 to which is affixed the blast head and the spindles (not shown). The Z axis head plate 24, as shown, moves in the Z axis direction in a direction parallel to the X axis. The Z axis is used to locate the cutting spindles or blast head over a particular location relative to the X axis and Y axis. The X axis positioning mechanism includes rail guides 60, 62 affixed to the subplate 18. Also shown is the X-axis rail 48 on which the rail guide 60 moves and a screw nut 64 on the X axis screw 44. The Y axis is similarly provided with rails 56, 58 affixed to the subplate 18 and rail guides 68, 70. The motor 46 for movement along the X axis, and the 20 motor 52 for movement along the Y axis are also shown. As shown, the Z axis includes rails 71, 72, a screw 76 and a motor 74 for movement along the Z axis.

Figure 4:
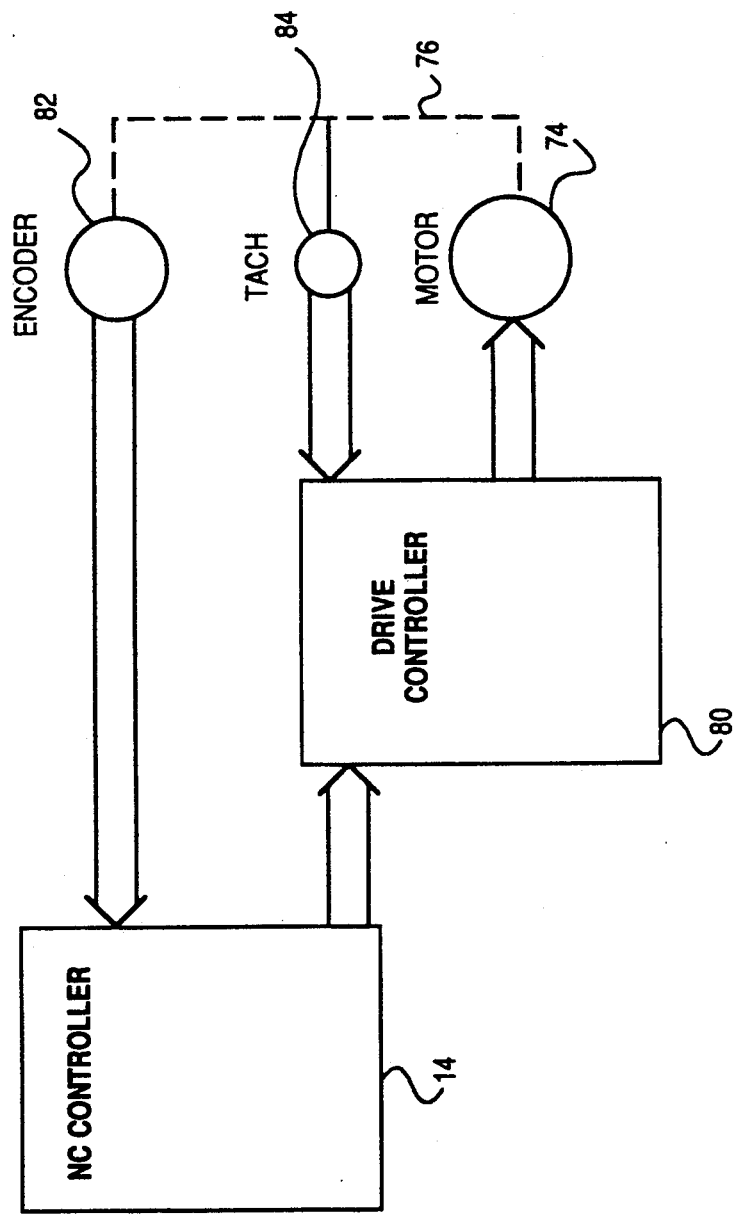
FIG. 4 shows a block diagram of a motor control in accordance with the invention.

Movements in the X, Y, and Z axes are controlled by three conventional linear motion feedback systems. One such system for the Z axis is shown in FIG. 4. These systems each conventionally include four chief elements, the drive controller 80, the motor 74, the tachometer 84, and an encoder 82. These components are preferably commercially available standard components controlled by the NC controller 14 as is well known in the art. As described above, each motor such as 74 drives a lead screw such as 76 which controls the motion of the XY table 15 or head plate 24 (See FIG. 1). Other well known forms of motion control such as stepper motors are used to provide motion control in other embodiments of the invention.

The encoder 82 converts rotational motion into electrical signals for the controller 80 to count and convert into position information. Glentek drive controller modes GA4561 and GA4552-4 are used for the drive controllers 80 in one embodiment.

The W axis for the blast nozzle in one embodiment is controlled in a slightly different manner than are the other three (XYZ) axes. The W axis positioner includes a sixteen position indexing system to raise and lower the blast nozzle in the blast head 26 of FIG. 1. The NC controller 14 selects one of the four user set positioning switches and evaluates the value of the switch setting to determine if the value of the current position is above, below, or the same as the current position of the blast nozzle. Then in accordance with the NC controller's instruction, the blast nozzle is moved up or down as required. This system permits to compensate for blast nozzle wear and pattern size. In other embodiments, the W-axis control is provided by linear motors (as described above) or stepper motors or other motion control systems.

Figure 5:
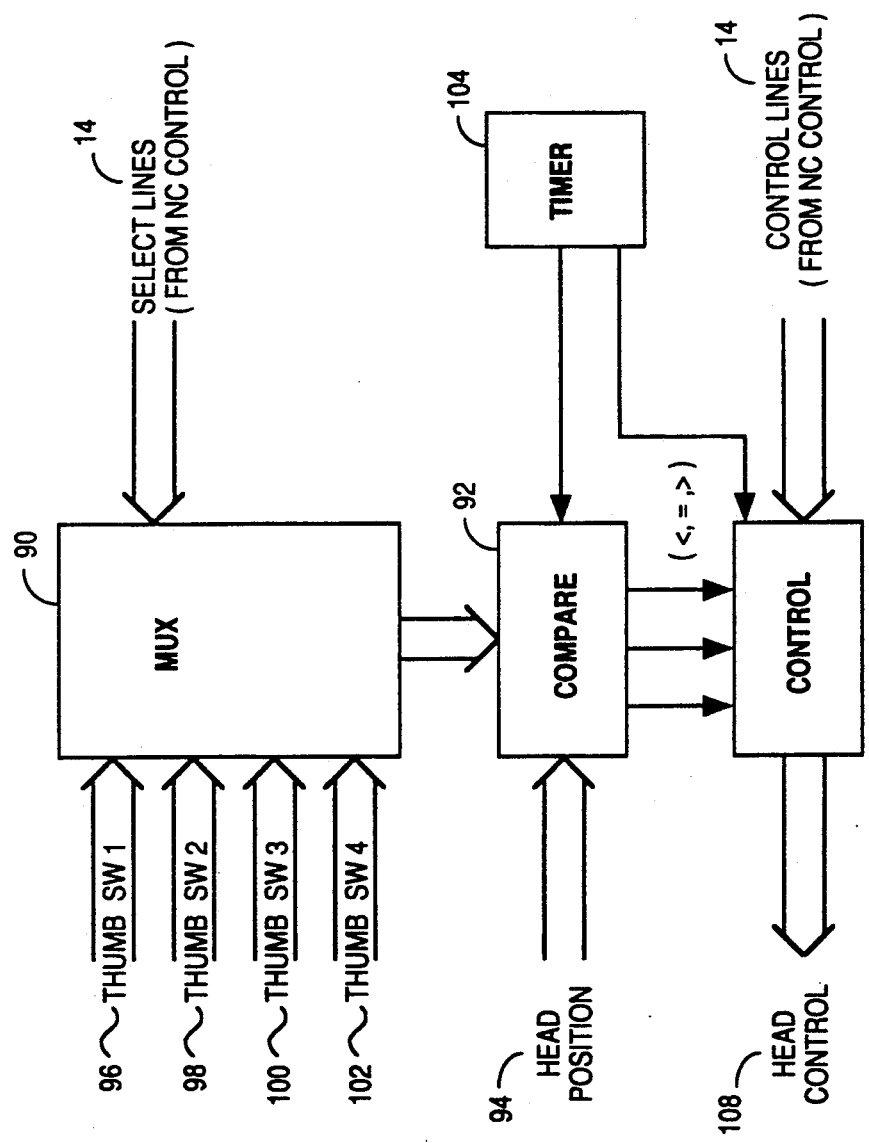
FIG. 5 shows a block diagram of an index control in accordance with the invention.

Shown in FIG. 5 is the index control system used in accordance with the invention for the purposes of controlling movement in the W axis direction of the blast nozzle in the blast head (not shown). Multiplexer 90 receives commands from the NC controller 14. Also shown is a compare circuit 92 to compare the value of the head position switch 94 to the value of the position indicator switches 96, . . . , 102, a timer 104, and a control circuit 106 for controlling the blast head (not shown). The control circuit 106 receives control signals from the NC controller 14 and status information from the comparator 92 and timer 104, and sends the appropriate signals to the blast head control circuitry 108.

Figure 6A:
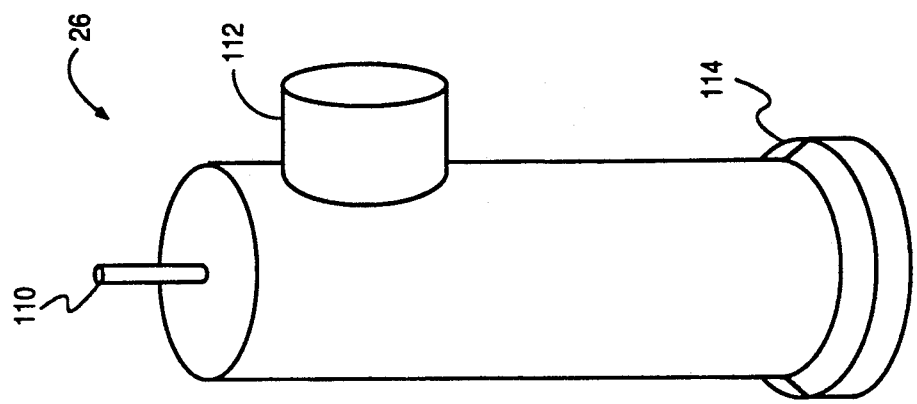
FIG. 6A shows a blast head in accordance with the invention.

The blast head 26, as shown in FIG. 6A, is a closed chamber reclaiming design capable of moving the blast nozzle (not shown) along a W axis of motion to control the blast nozzle working height from the working surface. The blast head 26 is designed to contain the sand blast debris and to vacuum away the debris and blasting medium from the work surface.

Shown are the blast line 110 which provides the blast media to the head, and the vacuum inlet 112 for vacuuming up the used blast medium. A skirt 114 is provided at the base to fit against the work surface (not shown).

Figure 6B:
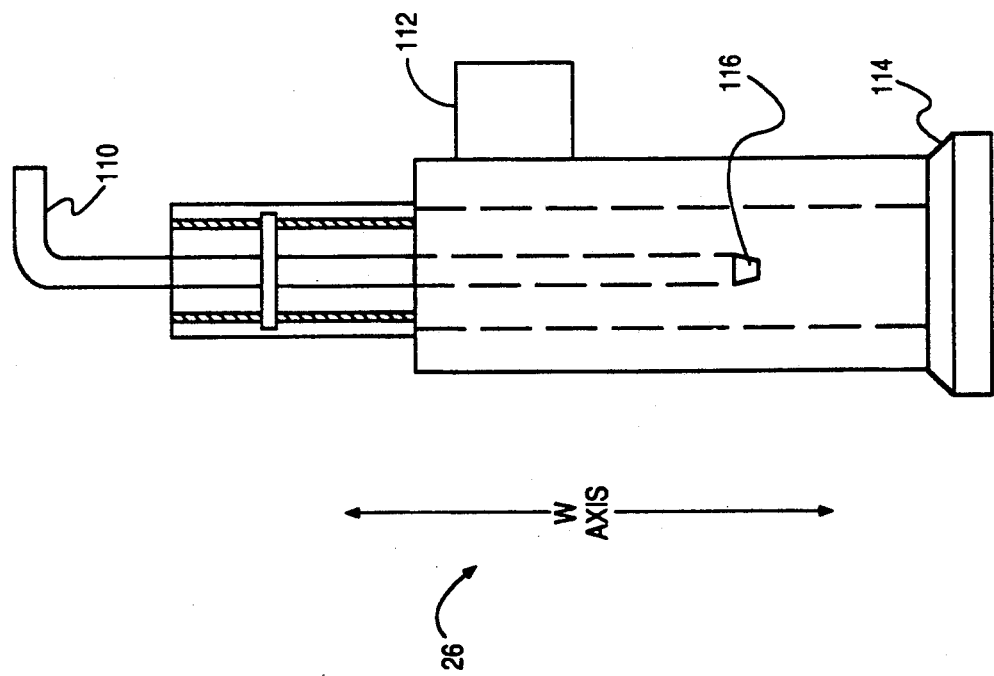
FIG. 6B shows a second view of a blast head in accordance with the invention.

Shown in FIG. 6B is a cross-sectional and extended view of the blast head 26 of FIG. 6A. Shown are the blast line 110, the vacuum inlet 112, and the blast nozzle 116 and movement of the blast nozzle 116 in the blast head along the W axis.

Figure 7:
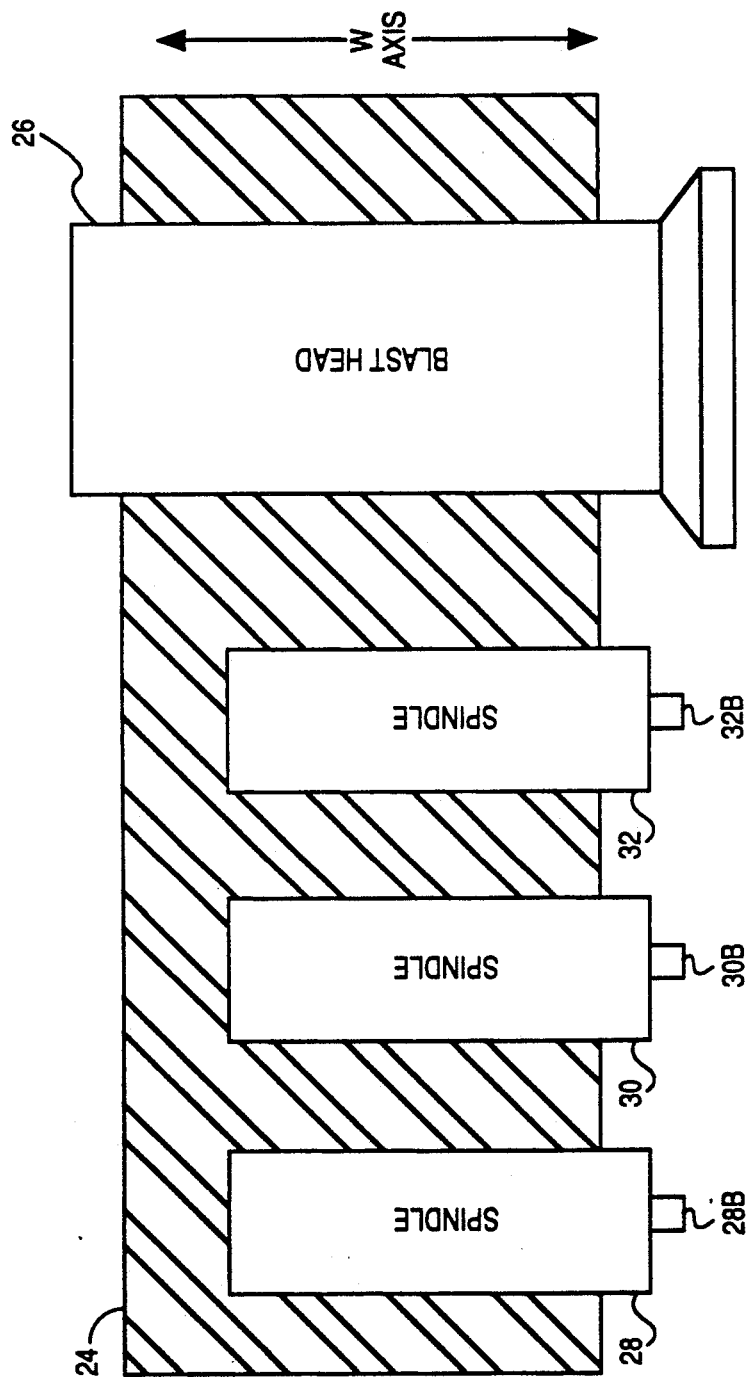
FIG. 7 shows a head plate in accordance with the invention.

FIG. 7 shows a view of the head plate 24 in accordance with the invention. Mounted on the head plate 24 are the blast head 26 as described above, and preferably three spindles 28, 30, 32, each spindle including a conventional router blade tip 28B, 30B, 32B which is used for cutting the resist material on the surface on the panel. In accordance with the invention the spindles 28, 30, 32 can be used to not only cut along the lines of the pattern, but also to remove the unneeded resist material. Preferably, the router blades 28B, 30B, 32B cut the resist material and then the cut resist material is manually peeled from the panel, except for the smaller areas where the router blades themselves remove the resist material. The spindles 28, 30, 32 and blast head 26 are pneumatically held up in the direction of the W axis away from the working surface 16 (not shown) when not in use, and lowered into position as needed. Other cutting methods for cutting the resist in accordance with the invention include use of nonrotating blades.

One advantage of the invention is that the router blades 28B, 30B, 32B can be used to clear an area of the resist material, and thus no resist peeling step is necessary. This method is especially advantageous for forming of fine lines.

The sand blasting system includes a pressure pot/reclaimer 36 (see FIG. 1) which is a conventional design to remove the sandblast medium and the debris from the vicinity of the panel surface. The system includes, as shown in FIG. 1, a conventional pressure pot 120 for sand-blasting, and a cyclone separator 122 to reclaim reusable blasting medium.

In accordance with the invention, computer software is provided. This computer software performs the function of accepting the DFX files provided by Autocad. Typically these files are large and conversion to the NC controller 14 language is very slow, i.e. taking many hours. In order to speed up this process in accordance with the invention a drawing hierarchy structure is provided. This structure provides subdrawings or primitives and a master drawing to collect all the subdrawings together. This software in accordance with the invention is illustrated in flowchart form in FIG. 8.

Figure 8:
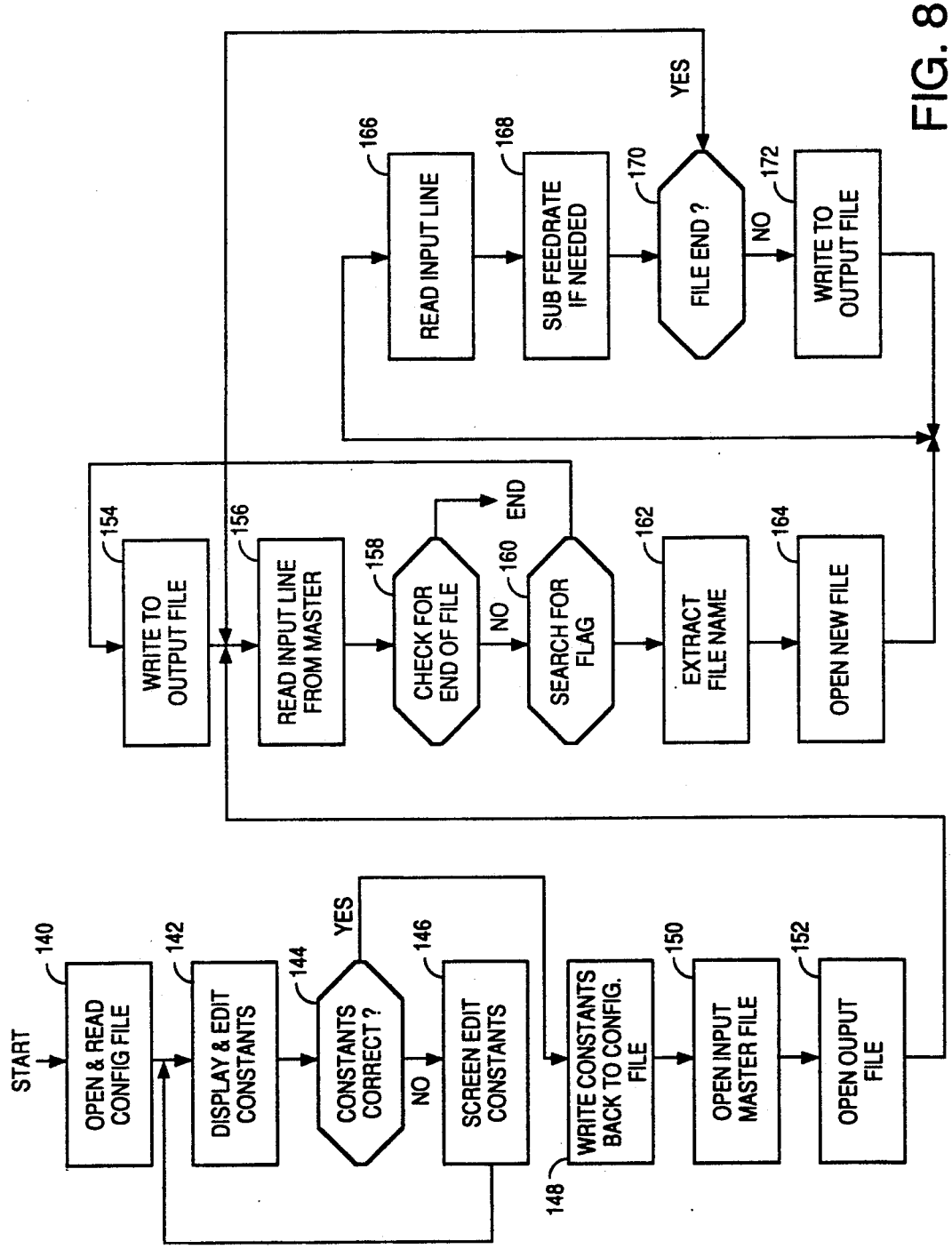
FIG. 8 shows a flow chart of a computer program in accordance with the invention.

As shown in FIG. 8 at the beginning of this program at step 140 a configuration file containing the configuration constants previously used is opened and read from the system disk. Then display and edit constants are established at step 142. At the next step 144 these constants are checked if correct. If not correct, opportunity is given to edit the constants on the screen by the computer user at step 146. If the constants are correct then the constants are written back to the configuration file at step 148. Then at the next step 150 a converted master drawing input file is opened for reading. The master file contains call statements to call up other drawings. At the next step 152 an output file is opened to write the final fully assembled converted drawing files.

Then, as seen, the process goes to the read input line from the master input file at step 156. Then the file is checked at step 158 to see if it is at its end. If it is, the program is completed. If not, then the input line is checked at step 160 to determine if it contains a subdrawing file flag. If there is no flag, control is returned to the write input line to output file at step 154. If there is a flag then the file name is extracted from the input line at step 162, and in the next step 164 a new file with the extracted file name is opened. Then an input line for the subdrawing is read at step 166. The next step 168 is to scan the line to determine if a different feed rate than the default feed rate for the XY table is needed. At the next step 170 it is determined if a subdrawing file is at its end. If the subdrawing file is at its end, then the program as shown returns back to the read input line from master step 156. If the file is not at its end, then the input time is written to the output file at step 172 and as shown the program continues to read the converted sub drawing line by line checking each line to see if a feedrate (i.e., speed of XY table movement) substitution is needed, or if it is the end of the subdrawing file. When the file end is detected the program returns to reading the master drawing file line by line at step 156.

The above described computer program is shown in detail in source code in the well known C language in Appendix A.

The above description of the invention is illustrative and not limiting. Further embodiments of the invention will be apparent to one of ordinary skill in the art in light of the invention. For instance, the invention is applicable in other embodiments to etching or grinding, and to carving methods other than sand blasting.

This disclosure includes copyrightable material. Permission is granted to make facsimile reproduction of material included in this disclosure and in Patent Office files. The copyright owner reserves all other copyright rights.

APPENDIX A  ©Gerald W. Stong

```c
#include <stdio.h>
#include <fcntl.h>
#include <conio.h>
#include <string.h>
include <dir.h> void main(void)
{
    FILE *infile, *outfile, *fp, *newfile, *cfgfile;
    int i, ch, now, end, Csub1, Csub2, Csub3, Csub4, Bsub1, Bsub2, Bsub3, Bsub4;
    char a;
    char *str, *ptr ,*ptr1, *ptr2, RSVP[1], nRSVP[1];
    char drive[MAXDRIVE], dir[MAXDIR], file[MAXFILE], ext[MAXEXT];
    char Ddrive[MAXDRIVE], Ddir[MAXDIR], Dfile[MAXFILE], Dext[MAXEXT];
    char inline[80], newline[80], new[80], callfile[80], msg[80];
    char LAYER[3], MASTER[30], NMASTER[30] ,DESTINATION[30];
    char defLAYER[3], defMASTER[30], defDESTINATION[30], DES_EXT[4];
```

```
char defMAS_PATH[30], defMAS_NAME[30], defDES_PATH[30], defDES_NAME[30];
char MAS_PATH[30], MAS_NAME[30], DES_PATH[30], DES_NAME[30], MAS_prog[30], DES_prog[30];
char defC_END[4], defB_END[4], defC_START[4], defB_START[4], C_END[4], B_END[4], C_START[4], B_START[4];
char defC_F1[5], defC_F2[5], defC_F3[5], defC_F4[5], C_F1[5], C_F2[5], C_F3[5], C_F4[5];
char defB_F1[5], defB_F2[5], defB_F3[5], defB_F4[5], B_F1[5], B_F2[5], B_F3[5], B_F4[5];

#define flag "###"
#define end "M02"
#define abs "G90"
#define incr "G91"
#define tera "Z"
#define dot "."
#define colon ":"

strcpy(RSVP,"N");

/# OPEN MERGE.CFG AND READ PREVIOUSLY USED CONSTANTS #/ if((cfgfile=fopen("merge.cfg","r+"))==NULL){
        perror("Cant't Open the MERGE.CFG file. ");
        exit (1);
        }
fgets(defMAS_PATH,80,cfgfile);
fgets(defMAS_NAME,80,cfgfile);
fgets(defDES_PATH,80,cfgfile);
fgets(defDES_NAME,80,cfgfile);
fgets(defC_END,80,cfgfile);
fgets(defC_START,80,cfgfile);
fgets(defB_END,80,cfgfile);
fgets(defB_START,80,cfgfile);
fgets(defC_F1,80,cfgfile);
fgets(defC_F2,80,cfgfile);
fgets(defC_F3,80,cfgfile);
fgets(defC_F4,80,cfgfile);
fgets(defB_F1,80,cfgfile);
fgets(defB_F2,80,cfgfile);
fgets(defB_F3,80,cfgfile);
fgets(defB_F4,80,cfgfile);
rewind(cfgfile);
printf("\n\n\n\n            ################################################### ");
printf("\n           #                                                   #");
printf("\n           #     ========   CRYSTALLINE IMAGES   ========      #");
printf("\n           #                                                   #");
printf("\n           #              FILE  MERGER  PROGRAM                #");
printf("\n           #                 Rev. 1.0  4/22/89                 #");
printf("\n           #                    developed by                   #");
printf("\n           #                     Jerry Stong                   #");
printf("\n           #       (All rights reserved by Crystalline Images) #");
printf("\n            ################################################### \n\n\n\n");

defMAS_PATH[strlen(defMAS_PATH)-1]='\0';
defMAS_NAME[strlen(defMAS_NAME)-1]='\0';
defDES_PATH[strlen(defDES_PATH)-1]='\0';
defDES_NAME[strlen(defDES_NAME)-1]='\0';
defC_END[strlen(defC_END)-1]='\0';
defC_START[strlen(defC_START)-1]='\0';
defB_END[strlen(defB_END)-1]='\0';
defB_START[strlen(defB_START)-1]='\0';
defC_F1[strlen(defC_F1)-1]='\0';
defC_F2[strlen(defC_F2)-1]='\0';
defC_F3[strlen(defC_F3)-1]='\0';
defC_F4[strlen(defC_F4)-1]='\0';
defB_F1[strlen(defB_F1)-1]='\0';
defB_F2[strlen(defB_F2)-1]='\0';
```

```
        defB_F3[strlen(defB_F3)-1]='\0';
        defB_F4[strlen(defB_F4)-1]='\0';

strcpy(MAS_PATH,defMAS_PATH);
        strcpy(MAS_NAME,defMAS_NAME);
        strcpy(DES_PATH,defDES_PATH);
        strcpy(DES_NAME,defDES_NAME);
        strcpy(C_END,defC_END);
        strcpy(C_START,defC_START);
        strcpy(B_END,defB_END);
        strcpy(B_START,defB_START);
        strcpy(C_F1,defC_F1);
        strcpy(C_F2,defC_F2);
        strcpy(C_F3,defC_F3);
        strcpy(C_F4,defC_F4);
        strcpy(B_F1,defB_F1);
        strcpy(B_F2,defB_F2);
        strcpy(B_F3,defB_F3);
        strcpy(B_F4,defB_F4);
DISPLAY:

printf("\n\n\n\n**************************************************** ");
        printf("\n                     MERGE DEFAULT VALUES          ");
        printf("\n                                                   ");
        printf("\n    Master file path ..................... ( %s )",defMAS_PATH);
        printf("\n    Master file name ..................... ( %s )",defMAS_NAME);
        printf("\n    Destination file path ................ ( %s )",defDES_PATH);
        printf("\n    Destination file name ................ ( %s )",defDES_NAME);
        printf("\n                                                   ");
        printf("\n    Cutting layer to start with .......... ( %s )",defC_START);
        printf("\n                   ending at  ........... ( %s )",defC_END);
        printf("\n    Blasting layers to start with ........ ( %s )",defB_START);
        printf("\n                   ending at  ........... ( %s )",defB_END);
        printf("\n                                                   ");
        printf("\n    Speed settings  (Fxx)      ( Cutting )     ( Blasting )");
        printf("\n                   feedrate 1 ... ( %s )  ......... ( %s )",defC_F1,defB_F1);
        printf("\n                   feedrate 2 ... ( %s )  ......... ( %s )",defC_F2,defB_F2);
        printf("\n                   feedrate 3 ... ( %s )  ......... ( %s )",defC_F3,defB_F3);
        printf("\n                   feedrate 4 ... ( %s )  ......... ( %s )",defC_F4,defB_F4);
        printf("\n                                                   ");
        printf("\n    Input files must have .C## or .B## extensions.    ");
        printf("\n    Output files will have .##C or .##B extensions.   ");
        printf("\n**************************************************** ");

printf("\n\n\n\n Would you like to change any of the above constants?  (Y/N) ( %s ) ",RSVP);
            if((gets(nRSVP))==NULL){
                strcpy(nRSVP,RSVP);
                }
            strupr(nRSVP);
            if(strstr("Y",nRSVP)==NULL){
                goto 60;
                } printf(" Enter the file path for the MASTER file: ( %s ) ",defMAS_PATH);
        if((gets(MAS_PATH))==NULL){
            strcpy(MAS_PATH,defMAS_PATH);
            }
        printf(" Enter the MASTER file name: ( %s ) ",defMAS_NAME);
        if((gets(MAS_NAME))==NULL){
            strcpy(MAS_NAME,defMAS_NAME);
            }
```

```c
printf(" Enter the file path for the DESTINATION file: < %s > ",defDES_PATH);
if(!(gets(DES_PATH))==NULL){
    strcpy(DES_PATH,defDES_PATH);
    }
printf(" Enter the DESTINATION file name: < %s > ",defDES_NAME);
if(!(gets(DES_NAME))==NULL){
    strcpy(DES_NAME,defDES_NAME);
    } printf(" Enter the starting cutting layer to merge: < %s > ",defC_START);
if(!(gets(C_START))==NULL){
    strcpy(C_START,defC_START);
printf(" Enter the ending cutting layer number: < %s > ",defC_END);
if(!(gets(C_END))==NULL){
    strcpy(C_END,defC_END);
    } printf(" Enter the starting blasting layer to merge: < %s > ",defB_START);
if(!(gets(B_START))==NULL){
    strcpy(B_START,defB_START);
    }
printf(" Enter the ending blasting layer number: < %s > ",defB_END);
if(!(gets(B_END))==NULL){
    strcpy(B_END,defB_END);
    } printf(" Enter the 1st cutting feedrate: < %s > ",defC_F1);
if(!(gets(C_F1))==NULL){
    strcpy(C_F1,defC_F1);
    }
printf(" Enter the 2nd cutting feedrate: < %s > ",defC_F2);
if(!(gets(C_F2))==NULL){
    strcpy(C_F2,defC_F2);
    }
printf(" Enter the 3rd cutting feedrate: < %s > ",defC_F3);
if(!(gets(C_F3))==NULL){
    strcpy(C_F3,defC_F3);
    }
printf(" Enter the 4th cutting feedrate: < %s > ",defC_F4);
if(!(gets(C_F4))==NULL){
    strcpy(C_F4,defC_F4);
    } printf(" Enter the 1st blasting feedrate: < %s > ",defB_F1);
if(!(gets(B_F1))==NULL){
    strcpy(B_F1,defB_F1);
    }
printf(" Enter the 2nd blasting feedrate: < %s > ",defB_F2);
if(!(gets(B_F2))==NULL){
    strcpy(B_F2,defB_F2);
    }
printf(" Enter the 3rd blasting feedrate: < %s > ",defB_F3);
if(!(gets(B_F3))==NULL){
    strcpy(B_F3,defB_F3);
    }
printf(" Enter the 4th blasting feedrate: < %s > ",defB_F4);
if(!(gets(B_F4))==NULL){
    strcpy(B_F4,defB_F4);
    }
strcpy(defMAS_PATH,MAS_PATH);
strcpy(defMAS_NAME,MAS_NAME);
strcpy(defDES_PATH,DES_PATH);
strcpy(defDES_NAME,DES_NAME);
strcpy(defC_END,C_END);
```

```
        strcpy(defC_START,C_START);
        strcpy(defB_END,B_END);
        strcpy(defB_START,B_START);
        strcpy(defC_F1,C_F1);
        strcpy(defC_F2,C_F2);
        strcpy(defC_F3,C_F3);
        strcpy(defC_F4,C_F4);
        strcpy(defB_F1,B_F1);
        strcpy(defB_F2,B_F2);
        strcpy(defB_F3,B_F3);
        strcpy(defB_F4,B_F4);

goto DISPLAY;

60:     /* WRITE FINAL CONSTANTS BACK TO THE CONFIG FILE */
        strcat(defMAS_PATH,"\n\0");
        strcat(defMAS_NAME,"\n\0");
        strcat(defDES_PATH,"\n\0");
        strcat(defDES_NAME,"\n\0");
        strcat(defC_END,"\n\0");
        strcat(defC_START,"\n\0");
        strcat(defB_END,"\n\0");
        strcat(defB_START,"\n\0");
        strcat(defC_F1,"\n\0");
        strcat(defC_F2,"\n\0");
        strcat(defC_F3,"\n\0");
        strcat(defC_F4,"\n\0");
        strcat(defB_F1,"\n\0");
        strcat(defB_F2,"\n\0");
        strcat(defB_F3,"\n\0");
        strcat(defB_F4,"\n\0");

fputs(defMAS_PATH,cfgfile);
        fputs(defMAS_NAME,cfgfile);
        fputs(defDES_PATH,cfgfile);
        fputs(defDES_NAME,cfgfile);
        fputs(defC_END,cfgfile);
        fputs(defC_START,cfgfile);
        fputs(defB_END,cfgfile);
        fputs(defB_START,cfgfile);
        fputs(defC_F1,cfgfile);
        fputs(defC_F2,cfgfile);
        fputs(defC_F3,cfgfile);
        fputs(defC_F4,cfgfile);
        fputs(defB_F1,cfgfile);
        fputs(defB_F2,cfgfile);
        fputs(defB_F3,cfgfile);
        fputs(defB_F4,cfgfile);

fclose(cfgfile);
        strcpy(C_F1,"F");
        strcat(C_F1,defC_F1);
        strcat(C_F1,"\0");

strcpy(C_F2,"F");
        strcat(C_F2,defC_F2);
        strcat(C_F2,"\0");

strcpy(C_F3,"F");
        strcat(C_F3,defC_F3);
        strcat(C_F3,"\0");

strcpy(C_F4,"F");
        strcat(C_F4,defC_F4);
        strcat(C_F4,"\0");
```

```
        strcpy(B_F1,"F");
        strcat(B_F1,defB_F1);
        strcat(B_F1,"\0");

strcpy(B_F2,"F");
        strcat(B_F2,defB_F2);
        strcat(B_F2,"\0");

strcpy(B_F3,"F");
        strcat(B_F3,defB_F3);
        strcat(B_F3,"\0");

strcpy(B_F4,"F");
        strcat(B_F4,defB_F4);
        strcat(B_F4,"\0");

/* try to open the input file "MASTER" if it can't be found give error an error message */ strcpy(MAS_prog,MAS_PATH);
        strcat(MAS_prog,MAS_NAME);
        strcat(MAS_prog,".mas");
        if((infile = fopen(MAS_prog,"rs")) == NULL) {
                sound(100);
                delay(500);
                nosound();
                perror(" Can't Open the Master file ");
                printf("\n Attempted to open  %s\n",MAS_prog);
                system("c:");
                exit (1);
        fnsplit(MAS_prog,drive,dir,file,ext);

/* Process the cutting layers */ now=atoi(C_START);
                Csub1=0;
                Csub2=0;
                Csub3=0;
                Csub4=0;

CLAYER:         if ((now>atoi(C_END))||(now==0)){
                goto CONT;
                }
                /* try to open the output file "DESTINATION", if the exists delete the old one first */ strcpy(DES_prog,DES_PATH);
                strcat(DES_prog,DES_NAME);
                strcat(DES_prog,".");
                strcat(DES_prog,"P");
                itoa(now,C_START,10);
                strcat(DES_prog,C_START);

if((outfile = fopen(DES_prog,"ws")) == NULL) {
                sound(100);
                delay(500);
                nosound();
                perror(" Can't Open the Destination File ");
                system("C:");
                exit (1);
                } strcpy(LAYER,"C");
        strcat(LAYER,C_START);
```

```c
/* Write the file selection to the screen */ printf("\n\n\n\n The MASTER file opened is %s ",MAS_prog);
        printf("\n\n The DESTINATION file opened is %s",DES_prog);
        printf("\n\n The LAYER to be compiled is %s\n\n",LAYER);
        printf("\n   >>>>>>>>>>>>        PLEASE WAIT         <<<<<<<<<<<<\n");
        sound(500);
        delay(500);
        sound(800);
        delay(500);
        nosound();
        delay(1);
/* Read the MASTER file line by line */ do{
                fgets(inline,80,infile);
                printf("\n Getting another line");
                if(feof(infile)){
                        puts("\nNo More!!   Fini!");
                        fcloseall();
                        exit(1);
                        }
                if ((strstr(inline,incr))!=NULL) a='I';
                if ((strstr(inline,abs))!=NULL) a='A';

/* START OF PROGRAM CALL LOOP */ if ((str = strstr(inline,flag))!=NULL){
                        str+=3;
                        for(i=0;str[i]!='$';i++)
                        new[i]=str[i];
                        new[i]='\0';
                        strcpy(ext,".");
                        strcat(ext,LAYER);
                        fnmerge(callfile,drive,dir,new,ext);
                        if((newfile = fopen(callfile,"rs"))==NULL){
                                perror("\nSorry, can't open callfile ");
                                printf("\n\n Attempted to open callfile ");
                                printf("%s\n\n",callfile);
                                system("C:");
                                exit(1);
                                }
                        fgets(newline,80,newfile);
                        if(strstr(newline,term)!=NULL){
                                fgets(newline,80,newfile);
                                strcpy(msg,"; START OF PROGRAM CALL ");
                                strcat(msg,callfile);
                                strcat(msg,"\n");
                                fputs(msg,outfile);
                                printf("START OF PROGRAM CALL  %s\n",callfile);
                                }
                do {
                        printf("\n Doing feedrate sub ");
                        if((strcmp(newline,"F1\n\0"))==0){
                                strcpy(newline,C_F1);
                                Csub1=Csub1+1;
                                sound(1500);
                                delay(5);
                                nosound();
                                }
```

```
            if((strcmp(newline,"F2\n\0"))==0){
                strcpy(newline,C_F2);
                Csub2=Csub2+1;
                sound(1700);
                delay(5);
                nosound();
                }
            if((strcmp(newline,"F3\n\0"))==0){
                strcpy(newline,C_F3);
                Csub3=Csub3+1;
                sound(1900);
                delay(5);
                nosound();
                }
            if((strcmp(newline,"F4\n\0"))==0){
                strcpy(newline,C_F4);
                Csub4=Csub4+1;
                sound(2100);
                delay(5);
                nosound();
                }
            printf("%s",newline);
            fputs(newline,outfile);
            fgets(newline,80,newfile);
    }while (strstr(newline,term) == NULL);

if (a=='I'){
        fputs(incr,outfile);
        fputs("\n",outfile);
        printf(incr);
        printf("\n");
        }
    if (a=='A'){
        fputs(abs,outfile);
        fputs("\n",outfile);
        printf(abs);

fclose(newfile);
        fgets(inline,80,infile);
        strcpy(msg,"; END OF PROGRAM CALL  ");
        strcat(msg,callfile);
        strcat(msg,"\n");
        fputs(msg,outfile);
        printf("END OF PROGRAM CALL  %s\n",callfile);

}
    fputs(inline,outfile);
    printf("%s",inline);

}while (strstr(inline,end)==NULL);

fgets(inline,80,infile);
    fputs(inline,outfile);
    printf("%s",inline);
    now=now+1;
    rewind(infile);
    goto CLAYER;

CONT:

/* Process the blasting layers */

Bsub1=0;
        Bsub2=0;
```

```
                Bsub3=0;
                Bsub4=0;
                now=atoi(B_START);

BLAYER:         if ((now>atoi(B_END))||(now==0)){
                goto END;
                }
                /* try to open the output file "DESTINATION", if the exists delete the old one first */ strcpy(DES_prog,DES_PATH);
                strcat(DES_prog,DES_NAME);
                strcat(DES_prog,".");
                strcat(DES_prog,"E");
                itoa(now,B_START,10);
                strcat(DES_prog,B_START);

if((outfile = fopen(DES_prog,"ws")) == NULL) {
                sound(100);
                delay(500);
                nosound();
                perror(" Can't Open the Destination File ");
                system("C:");
                exit (1);
                } strcpy(LAYER,"B");
        strcat(LAYER,B_START);
/* Write the file selection to the screen */ printf("\n\n\n\n The MASTER file opened is  %s ",MAS_prog);
        printf("\n\n The DESTINATION file opened is  %s",DES_prog);
        printf("\n\n The LAYER to be compiled is  %s\n\n",LAYER);
        printf("\n   >>>>>>>>>>>        PLEASE WAIT       <<<<<<<<<<<\n");
        sound(500);
        delay(500);
        sound(800);
        delay(500);
        nosound();
        delay(1);

/* Read the MASTER file line by line */ do{
                fgets(inline,80,infile);
                if(feof(infile)){
                        puts("\nNo More!!  Fini!");
                        fcloseall();
                        exit(1);
                        }
                if ((strstr(inline,incr))!=NULL) a='I';
                if ((strstr(inline,abs))!=NULL) a='A';

/* START OF PROGRAM CALL LOOP */ if ((str = strstr(inline,flag))!=NULL){ str+=3;
                        for(i=0;str[i]!=' ';i++)
                        new[i]=str[i];
                        new[i]='\0';
```

```
                strcpy(ext,".");
                strcat(ext,LAYER);
                fmerge(callfile,drive,dir,new,ext);
                if((newfile = fopen(callfile,"rs"))==NULL){
                        perror("\nSorry, can't open callfile ");
                        printf("\n\n Attempted to open callfile ");
                        printf("%s\n\n",callfile);
                        system("C:");
                        exit(1);
                        }
                fgets(newline,80,newfile);
                if(strstr(newline,term)!=NULL){
                        fgets(newline,80,newfile);
                        strcpy(msg,"; START OF PROGRAM CALL ");
                        strcat(msg,callfile);
                        strcat(msg,"\n");
                        fputs(msg,outfile);
                        printf("START OF PROGRAM CALL  %s\n",callfile);
                        }
do {
                if((strcmp(newline,"F1\n\0"))==0){
                        strcpy(newline,B_F1);
                        Bsub1=Bsub1+1;
                        sound(1500);
                        delay(5);
                        nosound();
                        }
                if((strcmp(newline,"F2\n\0"))==0){
                        strcpy(newline,B_F2);
                        Bsub2=Bsub2+1;
                        sound(1700);
                        delay(5);
                        nosound();
                        }
                if((strcmp(newline,"F3\n\0"))==0){
                        strcpy(newline,B_F3);
                        Bsub3=Bsub3+1;
                        sound(1900);
                        delay(5);
                        nosound();
                        }
                if((strcmp(newline,"F4\n\0"))==0){
                        strcpy(newline,B_F4);
                        Bsub4=Bsub4+1;
                        sound(2100);
                        delay(5);
                        nosound();
                        }
                printf("%s",newline);
                fputs(newline,outfile);
                fgets(newline,80,newfile);
}while (strstr(newline,term) == NULL);

if (m=='I'){
                        fputs(incr,outfile);
                        fputs("\n",outfile);
                        printf(incr);
                        printf("\n");
                        }
                if (m=='A'){
                        fputs(abs,outfile);
                        fputs("\n",outfile);
                        printf(abs);
```

```
                    printf("\n");
                    )
            fclose(newfile);
            fgets(inline,80,infile);
            strcpy(msg,"; END OF PROGRAM CALL ");
            strcat(msg,callfile);
            strcat(msg,"\n");
            fputs(msg,outfile);
            printf("END OF PROGRAM CALL %s\n",callfile);
                    )
                fputs(inline,outfile);
                printf("%s",inline);

}while (strstr(inline,end)==NULL);

fgets(inline,80,infile);
        fputs(inline,outfile);
        printf("%s",inline);
        now=now+1;
        rewind(infile);
        goto BLAYER;

END:    fcloseall;
        sound(600);
        delay(300);
        sound(800);
        delay(300);
        sound(1600);
        delay(300);
        nosound();
        printf("\n\n >>>>>>   SUMMARY OF SUBSTITUTIONS  <<<<<<\n\n");
        printf("           Cutting     Blasting\n");
        printf("  feedrate 1 ... %u .......... %u\n",Csub1,Bsub1);
        printf("  feedrate 2 ... %u .......... %u\n",Csub2,Bsub2);
        printf("  feedrate 3 ... %u .......... %u\n",Csub3,Bsub3);
        printf("  feedrate 4 ... %u .......... %u\n\n",Csub4,Bsub4);
        system("C:");
```

I claim:

1. A method of carving an image in a surface comprising the steps of:
 forming a resist layer on the surface;
 providing a blast head and cutter both mounted on a single support;
 cutting a pattern in the resist layer under automatic control using the cutter so as to expose portions of the surface; and
 blasting under automatic control using the blast head the portions of the surface exposed so as to form the image.

2. The method of claim 1, further comprising the step of designing the pattern under automatic control.

3. The method of claim 1, wherein the steps of cutting and blasting are under control of a computer.

4. The method of claim 1, wherein the step of blasting comprises the step of moving the support relative to the surface.

5. The method of claim 1, further comprising the step of providing a second cutter including a rotating router blade mounted on the support for performing the step of cutting and also for removing the cut portions of the resist layer.

6. The method of claim 4, wherein the step of moving comprises the step of moving at least a portion of the blast head in a direction perpendicular to a plane of the surface.

7. The method of claim 2, wherein the step of designing the pattern comprises the steps of:
 dividing an artist's master drawing of the pattern into at least two subdrawings; and
 translating each of the subdrawings into a set of instructions for the steps of cutting and carving the pattern.

8. The method of claim 7, further comprising the step of merging the sets of instructions into one set of instructions.

9. The method of claim 1, further comprising the step of providing the surface to be a flat surface of a piece of glass.

10. The method of claim 1, further comprising the step of providing the surface to be a flat surface of a piece of stone.

11. The method of claim 1, wherein the steps of cutting and blasting are under the automatic control of a CAD/CAM system.

12. A device for carving an image in a surface comprising:
 at least one cutter for automatically cutting a pattern in a resist layer formed on the surface so as to expose a portion of the surface; and
 a blast head for automatically carving the exposed portion of the surface, wherein both the cutter and blast head are mounted on a single support, movement of which is automatically controlled.

13. The device of claim 12, further comprising means for automatically designing the pattern.

14. The device of claim 12, wherein the support movement is under computer control.

15. The method of claim 1, further comprising the step of clearing away at least a portion of the resist layer by the cutter simultaneously with the step of cutting.

16. The method of claim 1 further comprising the steps of providing a chamber immediately surrounding the blast head and which contacts the surface; and provided a reclaimer for reclaiming from the enclosure a blast medium expelled from the blast head.

17. The device of claim 12, further comprising at least a second cutter mounted on the support, and wherein the second cutter is a rotating router blade for both cutting and clearing away the resist layer.

18. The device of claim 12, further comprising:
a chamber immediately surrounding the blast head and which contacts the surface; and
a reclaimer connected to the chamber for reclaiming from the enclosure a blast medium expelled from the blast head.

19. A device for carving an image in a surface comprising:
at least two rotating router blades for cutting a pattern in a resist layer formed on the surface and simultaneously clearing at least a portion of the resist layer from the surface;
a blast head for blasting the surface with a blast medium;
a support holding the two rotating router blades and the blast head;
automatic motion control for moving the support in three dimensions relative to the surface;
a chamber immediately surrounding the blast head and contacting the surface;
a reclaimer connected to the chamber for reclaiming a blast medium expelled from the blast head;
and wherein the blast head includes a nozzle inside the chamber, the nozzle being movable inside the chamber relative to the surface.

* * * * *